United States Patent [19]

Vanderbilt

[11] 3,867,333

[45] Feb. 18, 1975

[54] NATURAL GRAPHITE-REINFORCED CYCLIZED BUTADIENE ELASTOMERS

[76] Inventor: Byron M. Vanderbilt, 516 Lake Shore Ln., Chapel Hill, N.C. 27154

[22] Filed: Dec. 22, 1972

[21] Appl. No.: 317,612

[52] U.S. Cl.......... 260/42.32, 260/42.15, 260/83.3, 260/85.1, 260/94.7 A
[51] Int. Cl...................... C08c 11/18, C08d 11/00
[58] Field of Search............. 260/734, 85.1, 94.7 A, 260/94.7 HA, 94.7 N, 83.3, 42.32, 42.15

[56] References Cited
UNITED STATES PATENTS

| | | | |
|---|---|---|---|
| 2,625,523 | 1/1953 | Garber et al....................... | 260/890 |
| 3,274,148 | 9/1966 | Sparks et al...................... | 260/85.1 |

OTHER PUBLICATIONS

Rubber World–Materials & Compounding Ingredients for Rubber & Plastics (Rubber World) (N.Y.) (1965), page 443, TS 1890 I53.

*Primary Examiner*—Melvyn I. Marquis
*Assistant Examiner*—H. H. Fletcher
*Attorney, Agent, or Firm*—Mills and Coats

[57] ABSTRACT

Natural graphite-reinforced, cyclized butadiene elastomers are prepared by mixing a homopolymer or copolymer of butadiene and a monoolefinic monomer with natural graphite, curing this mixture with an organic peroxide or mononuclear quinone and thereafter cyclizing the cured mixture by heating at a temperature of 350°–700°F. The natural graphite-reinforced, cyclized butadiene polymers are hard, infusible, thermoset materials which have outstanding physical properties, particularly modulii, and resistance to air oxidation, inorganic acids and other chemicals, and overall aging at elevated temperatures.

8 Claims, No Drawings

3,867,333

NATURAL GRAPHITE-REINFORCED CYCLIZED BUTADIENE ELASTOMERS

BACKGROUND OF THE INVENTION

As is well known, the use of fillers in elastomers, particularly carbon blacks, results in vulcanizates of greatly improved properties. For example, whereas cured pure gum SBR is of low strength, very low abrasion resistance, and poor tear resistance, that containing 50 parts or so of carbon black per 100 of SBR makes a tough, long-serviceable tire tread. In case of plastics, use of carbon blacks in concentrations higher than a very few parts tends to degrade physical properties rather than to enhance them. Graphite fillers have only very limited use in elastomers and practically no commerical utilization in plastics.

It has now been found that by proper choice of graphite filler in selected butadiene polymers and copolymers, it is possible by vulcanization followed by thermal cyclization to produce thermoset plastics containing as high as 85 percent graphite by weight and having strengths and modulii greater than those of the corresponding gum stocks. Due to the combination of high physical strength and stiffness along with high graphite content, such composites are particularly suitable for constructing equipment to handle corrosive chemicals, as bearings requiring no lubricants, and for uses where moderate electrical conductivity is required.

SUMMARY OF THE INVENTION

This invention relates to cyclized butadiene elastomers. Butadiene homopolymers and copolymers of butadiene with a monoolefinic monomer are compounded with natural graphite and cured with an organic peroxide or mononuclear quinone. The product is thereafter cyclized by heating at a temperature of about 350°–700°F.

The resulting cyclized butadiene polymers are hard infusible thermoset compositions with outstanding physical properties.

PROCESS OF THE INVENTION

The Elastomeric Butadiene Polymer

Elastomeric butadiene polymers employed in the process of this invention are those which have at least 10 mole percent, preferably at least 15 mole percent, of their unsaturation present as the 1,2-type. For the purposes of the present invention, the term "butadiene polymer" encompasses homopolybutadiene and copolymers of butadiene and at least one other olefinically unsaturated monomer. Piperylene may also be used for preparing such elastomers, but those of butadiene are preferred. The term "monomer" as used in the specification and claims means olefinically unsaturated monomers having only one site of unsaturation.

The elastomeric butadiene polymers employed in this invention are well known in the prior art and many are available commercially. Homo- and copolymers of butadiene with styrenes prepared by organolithium catalysis (with or without modifiers such as ethers, amines, etc.) and by sodium catalysts are particularly useful in this invention. Elastomers prepared by free radical catalysis (usually in emulsion) are also highly useful. Free radical polymerizations are commonly employed for the preparation of commerical grades of butadienea-crylonitrile elastomers, a type of copolymer found particularly suitable for this invention. Excess quantities of emulsifiers and rosin or fatty acids usually present in elastomers prepared by emulsion polymerization should be removed prior to the process for preparing rigid cyclized products therefrom.

The elastomeric butadiene copolymers suitable for the purposes of this invention will contain at least about 15 mole percent, preferably 30–40 mole percent, based on total monomers, of the polymerizable olefinically unsaturated monomer. Suitable polymerizable monomers include styrene and substituted styrenes such as alpha-methyl styrene, o-, m-, or p-chlorostyrene, the various dibromo- and dichloro-styrenes, p-methoxy styrene, the vinyl toluenes such as p-methyl styrene and m-methyl styrene, p-t-butyl styrene, the dimethyl styrenes, etc.; unsaturated nitriles and acrylates such as acrylonitrile, alphamethyl acrylonitrile, ethyl acrylate, butyl acrylate, methyl methacrylate, etc.; vinyl ethers, vinyl ketones, vinyl chloride, alpha- and beta-vinyl naphthalenes, etc. The preferred elastomers for use in this invention are the copolymers of butadiene and styrene, and butadiene and acrylonitrile.

The term "monoolefinic monomers" as used in the specification and claims means monomers having only one site of olefinic unsaturation in their molecule. The scope of the term includes not only hydrocarbon compounds but heterogeneous compounds such as nitriles, ethers, acrylates, ketones and halogen-containing monomers, e.g., chlorinated. The preferred monoolefinic monomers are $C_2$–$C_{12}$ organic compounds. The preferred organic compounds are hydrocarbons and nitriles.

The elastomeric butadiene coopolymers employed in this invention may be random, block or of the graft type. The butadiene polymers employed in this invention should be of such molecular weight that they process well on conventional rubber equipment. Mooney viscosity values of the raw polymers (i.e. the curable elastomers) in the 45–55 range are preferred.

THE CURING AGENT

The curing agent employed in the process of this invention is an organic peroxide or mononuclear quinone or halogenated quinone; generally, such curing agents will be utilized in amounts of 0.5 to 10, preferably 1 to 3 parts, per 100 parts of the butadiene polymer. Although the choice of the curing agent is not critical, as a matter of convenience it is desirable to utilize organic peroxides or quinones which have a sufficiently high half-life temperature so as to facilitate mixing of the butadiene polymer with the curing agent at elevated temperatures without premature crosslinking occurring during the mixing operation. Desirably, the organic peroxide will have a half-life of at least 10 minutes at 260°F. Suitable examples of such organic peroxides include t-butyl peroxy isobutyrate, di-t-butyl diperthalate, t-butyl perbenzoate, dicumyl peroxide, di-t-butyl peroxide, t-butyl hydroperoxide, t-methane hydroperoxide, 2,5-dimethyl-2,5 bis (t-butylperoxy) hexane and 2,5-dimethyl-2,5 bis(t-butyl-peroxy) hexyne-3, bis(alpha-tert.-butylperoxy isopropyl) benzene, etc. The quinone useful for the purposes of the present invention may be a mononuclear quinone or halogenated quinone as well as its derivatives. Suitable quinones and halogenated quinones include o- and p-benzoquinones, tetrabromo-p-benzoquinone, and tetrachloro-o-benzoquinone, etc. The preferred quinone curing agent for the purposes of the present invention is tetrachloro-p-benzoquinone (i.e. "chloranil"). Use of about one part of zinc oxide per 100 parts of rubber with the chloranil is recommended in order to get most effective use of this quinone. The preferred organic peroxide is dicumyl peroxide and particularly preferred is bis-(alpha-tert.-butylperoxy isopropyl) benzene.

THE GRAPHITE FILLER

The graphite filler employed for the purposes of this invention must be a natural, as distinguished from the synthetic or artificial, type of graphite. Such natural graphite fillers will, for the purposes of the present invention, be present in the form of crystalline flakes or needles or possibly amorphous with the crystalline flake form most preferred and the amorphous form least preferred. The natural graphite filler will generally be employed in amounts of about 100 to about 800 parts, preferably 200–600 parts, per 100 parts of the butadiene polymer.

Best results are obtained with maximum filler loadings and for a given type of natural graphite, the amount of loading of filler with a given butadiene polymer will be primarily dependent upon the size of the particles. Thus, higher loadings can be obtained with the larger particles, while at low loadings, powders having a particle size range of a few microns diameter give the best results. In general, graphite fillers having a particle size distribution in excess (i.e. "coarser") than about 90 percent through 200 mesh are undersirable since they are too large to provide adequate surface for bonding with the butadiene polymer matrix.

As mentioned above, it is necessary that the graphite filler employed in the process of this invention be a natural as distinguished from a synthetic or artificial type of graphite. This criticality of the graphite being of the natural type is dictated by experimental results in which it was found that use of synthetic graphites prepared by the high temperature pyrolysis of gaseous hydrocarbons, or artificial graphites prepared by heating mixtures of coke and pitch, result in blistering of the surface of the butadiene polymer upon vulcanization and/or the subsequent step of cyclization, or products of low strength.

It has also been found that the degree of purity of the natural graphite filler can also affect the products obtained after vulcanization and/or the cyclization step. Thus, all other factors being equal, 85 percent purity graphite results in a product having severe blisters after vulcanization in contrast to the 98 percent (or higher) pure graphite which results in blister-free products. On the other hand, the "impure" natural graphite is desirable from an economic point of view since it is considerably less expensive than the "pure" graphite.

It has not been found that it is possible to upgrade impure (i.e., purity levels of 80–90 percent) graphite by certain treatments to be described hereinbelow; such upgraded graphite will result in products which are blister-free and which possess physical properties of the same order as those obtained with the use of the pure graphite fillers. The upgrading of the impure graphite is accomplished by treating the impure graphite with one or more reagents which are capable of reacting with the water of crystallization contained in the impure graphite. These reagents include silane esters, e.g., gamma-methacryloxypropyl trimethoxysilane, vinyl triethoxysilane, trimethoxyethoxy vinyl silane, gamme-methacrylpropyl trimethoxy silane and styrenyl trimethoxy silane; acid anhydrides, e.g., acetic anhydride, maleic anhydride, propionic anhydrode, monochloroacetic anhydride, and trichloroacetic anhydride; and metal oxides, e.g., magnesium oxide, zinc oxide, barium oxide, calcium oxide, and strontium oxide, etc. In addition, it is also possible to use a combination of such reagents, e.g., magnesium oxide and the silane esters, acidic anhydride followed by addition of magnesium oxide, etc.

The upgrading treatment is readily accomplished by contacting 0.5–5 parts, per 100 parts of the impure natural graphite, of the reagent with the impure natural graphite filler at temperatures in the range of 150°F. to 300°F. for about 20 minutes - 3 hours (tumbling of the graphite with the reagent is a convenient method of accomplishing such treatment). Alternatively, the upgrading treatment may be accomplished by simple admixture of the impure natural graphite, the reagent and the selected butadiene polymer prior to addition of the curing agent and hot milling such mixture at elevated temperatures (e.g., 200°–300°F.) for 2 minutes - 1 hour.

The first step of the process of this invention involves the mixing of the curable elastomeric butadiene polymer with natural graphite filler (and if desired, plasticizers, extender oils, antioxidants, etc.). When a high proportion of a natural graphite filler is to be employed, it is desirable to add such a filler to a cement or a solution of the rubber, mixing this cement or solution with the selected filler and therafter removing the solvent. In case of those elastomers synthesized in solution, such as those prepared with metal alkyl catalysts, it may be economically desirable to use the solution of rubber obtained in the synthesis. Also, in case of elastomers synthesized in emulson, the graphite and other additives may be added to the synthetic latex prior to coagulation and isolation of the rubber. The preparation of such premixes represents a preferred method of preparing rubber-graphite blends since, because of the lubricity of graphite, mechanical mixing of this filler with an elastomer may be difficult. Also, since graphite particles do not agglomerate as do carbon blacks, a graphite powder is dispersed relatively easily into a rubber latex or cement.

Use of some plasticizer with the rubber may be desirable from the standpoint of mixing. However, inert plasticizers such as mineral oils and esters of saturated acids and alcohols tend to lower the physical properties of the cyclized products. A preferred plasticizer is a polybutadiene or butadiene copolymer resin not greater than about 15,000 molecular weight and having at least 50 percent of its unsaturation as the 1,2-type. Such plasticizers co-react with the elastomer during the curing and cyclization steps and actually enhance the physical properties of the cyclized composite.

The mixing of the curable elastomeric butadiene polymer with the natural graphite filler (and with other desired additives) may be carried out with conventional rubber blending equipment, e.g., Banburies, extruders, roller mills, etc. The mixing operations may take place at any temperature; however, prior to adding the curing agent, the compound should be cooled to 200°F. or lower and a temperature of about 275°F. should not be exceeded during the final phase of the mixing process. Mixing temperatures will depend on the particular elastomeric curable butadiene polymer and the particular curing agent employed, but in general should not exceed 350°F. even in the absence of the curing agent.

The admixture of the elastomeric curable butadiene compound and the selected curative is then cured by heating at a temperature sufficient to activate the selected curative, e.g. 275° to 400°F., preferably 290° to 320°F. for a period of time ranging from 5 minutes to 2 hours, preferably 20 to 40 minutes. It is generally desirable that curing take place in the mold of the shape desireed for the final article; mold curing is particularly suitable where it is not desired to extensively machine the final article into its desired shape. When mold curing is employed, it is desirable to utilize sufficient pressure to force the butadiene polymer mixture into the desired shape, e.g., pressures of 400–10,000 psi, preferably 500–1,200 psi, are suitable.

After the butadiene polymer has been cured, it is removed from the mold (if a mold is utilized and thereafter "cyclized" by heating at temperatures in the range of about 330°F. to about 700°F. for about 2 to about 40 hours. The reactions which occur during the thermal treatment (heating at a temperature in the range of about 350°F. to about 700°F.) are primarily non-catalytic in nature, and it is possible to convert the butadiene polymers employed in this invention to hard, rigid, thermoset materials by heat alone (i.e., without previously curing the elastomeric butadiene polymer). The reactions which convert the elastomeric butadiene polymers to rigid thermoset materials are a combination of ring formation and crosslinking. The term "cyclization" as employed in the disclosure of this invention denotes a combination of intra-molecular ring formation and inter-molecular crosslinking; the term "cyclization" employed in the disclosure of this invention is also synonomous with "thermal treatment."

Preferably cyclization is carried out by heating the cured polymer at a temperature of about 350–450°F. for 20 minutes to 4 hours and thereafter elevating the temperature to 500°–600°F. for a period of time in the range of 2 to 36 hours. The cyclization step should take place in the presence of an inert atmosphere, e.g., nitrogen, argon, helium, etc., or in a vacuum, since the presence of oxygen or oxygen-containing gases during the cyclization step may adversely affect the surface of the cyclized butadiene polymer. Since an exothermic reaction is developed during the cyclization step, it may be desirable to carry out this operation in contact with metal plates to absorb the heat generated or in an inert liquid which could be externally heated or cooled in order to control the desired temperature (of course, this heat transfer medium should have a boiling point in excess of the temperatures employed during the cyclization step).

In particular, it has been found that when relatively thick articles are being cyclized, it is desirable to carry out the cyclization step in a liquid medium such as organic silicones, molten sodium, molten alloys of lead, or certain eutectic salt mixtures. The cyclization step need not be carried out on the article while it is in the mold, since the cured butadiene polymer will retain its shape during cyclization. Indeed, it is desirable that the cyclization step not be carried out with the article within the mold in order to allow the escape of any materials volatile at the cyclization temperature which were present in the original elastomer or which were generated in the curing step.

The cyclized butadiene polymers prepared by the process of this invention are easily machined, drilled, and sawed into desired shapes. They have improved impact properties over those of all thermoset plastics, both filled and unfilled, unless the latter contain fibrous fillers. Compression, flexural, and tensile modulii of these unique highly filled products are outstanding. Mechanical strength properties are good and are unexpectedly high compared to thermoset resins containing graphite or other particle fillers. The cyclized butadiene polymers also have a high degree of resistance to aging in air, exposure at elevated temperatures, and corrosive chemicals (such as salts, $Br_2$, mineral acids, etc.). As such, the cyclized butadiene polymers prepared by the process of this invention may be utilized and indeed give better performance in some of those areas in which polyesters, epoxies, phenolics, and other thermoset plastics are usually employed.

The following examples are submitted to illustrate the process of this invention. Unless otherwise indicated, all parts are on a weight basis and the temperatures employed throughout are in °F.

EXAMPLE 1

Listed below in Tables I and II are the curable elastomeric butadiene polymers and the graphite fillers employed in subsequent Examples 2 and 3.

TABLE I

BUTADIENE ELASTOMERS USED

| Trademark Name* | % Co-Monomer | Monomer Sequence | % Vinyl | Microstructure % Cis | % Trans | Mooney Viscosity |
|---|---|---|---|---|---|---|
| Solprene-301 | 25-Styrene | Random | 16.7 | 29.6 | 53.7 | 77 |
| Solprene-303 | 48-Styrene | Partial Block | 36.2 | 17.0 | 46.8 | 45 |
| Solprene-304 | 10-Styrene | Random | 27.1 | 27.7 | 45.2 | 32 |
| Solprene-201 | None | Homopolymer | 8.3 | 42.0 | 49.7 | 55 |
| Solprene-1204 | 25-Styrene | Random | 31.8 | 26.0 | 42.2 | 52 |
| Solprene-1205 | 25-Styrene | Block | 9.9 | 35.2 | 54.9 | 47 |
| Paracril-D | 44-Acrylonitrile | Random | 20 | 20 | 60 | 55 |
| Paracril-CJLT | 39-Acrylonitrile | Random | 18 | 7 | 75 | 50 |
| Paracril-C | 35-Acrylonitrile | Random | 20 | 20 | 60 | 80 |
| Paracril-B | 26-Acrylonitrile | Random | 20 | 20 | 60 | 80 |
| Paracril-BJ | 26-Acrylonitrile | Random | 20 | 20 | 60 | 50 |

*The Solprene elastomers were obtained from the Phillips Petroleum Company and the Paracrils from the Uniroyal Chemical Company.

TABLE II

NATURAL GRAPHITE FILLERS USED

| Sample Name* | Type | % Carbon | Particle Size | Remarks |
|---|---|---|---|---|
| A-230U | Natural-Flake | 99+ | 98% Through 325 Mesh | Madagascar, Large Flake Type |
| A-230 | Natural-Flake | 99+ | 65% Through 325 Mesh | Madagascar, Coarser Grade |
| A-92 | Natural-Crystalline | 98+ | 66% Through 325 Mesh | Coarse Grade of the Crystalline Type |
| A-280H | Natural-Crystalline | 98+ | 98% Through 325 Mesh | Ceylon, Needle Type Crystals |
| A-518 | Natural-Crystalline | 98+ | 83% Through 200 Mesh | Coarse Grade of the Crystalline Type |
| A-441 | Natural-Flake | 85 | 90% Through 325 Mesh | Mine Run Madagascar Type |
| A-509F | Natural-Amorphous | 85 | 90% Through 325 Mesh | Mine Run Mexican Type |
| A-Micro 875 | Natural-Flake | 99.9 | 78% Zero-2 Microns; only 0.4% over 10 Microns | Highly Refined and finely ground Madagascar Type |
| A-4084 | Artificial | 99.8 | 98% Through 325 Mesh | Manufactured Products and More Porous Than Naturals |
| S-5033 | Artificial | 98 | 99% Through 325 Mesh | |
| Pyrolytic | Synthetic | 99 | Macro as Received | Most Perfect Graphite Crystal |

*The A samples were obtained from Asbury Graphite Mills, Inc., the S sample from the Superior Graphite Company, and the pyrolytic grade from the National Carbon Products Company.

EXAMPLE 2

Elastomeric butadiene polymer blends were prepared by mixing, on a dual roller mill, the elastomeric butadiene polymer (100 parts in each case) and the components set forth in Table III. After mixing the components, each rubber blend was vulcanized by heating at 310°F. for 40 minutes in a compression mold under about 1,000 psi pressure. Portions of the cured rubber were then placed in a nitrogen atmosphere in an oven, brought to 350°F. and the temperature gradually raised to 500°F. over a period of 2½ hours. They were then baked at 500°F. for the indicated number of hours and the physical properties of the baked samples (i.e., the infusible, cyclized elastomers) are set forth in Table IV.

TABLE III

| Run No. | Elastomer | Graphite Type | Graphite Parts | Curative & Parts |
|---|---|---|---|---|
| 1 | Solprene-301 | None | None | Dicup[a], 1.25 |
| 2 | Paracril C | None | None | Dicup, 1.25 |
| 3 | Paracril CJLT | None | None | Dicup, 1.50 |
| 4 | Solprene-301 | A-230U | 240 | Dicup, 1.25 |
| 5 | Solprene-201 | A-230U | 216 | Dicup, 1.25 |
| 6 | Solprene-303 | A-230 | 320 | Dicup, 1.25 |
| 7 | Solprene-303 | A-230 | 240 | Dicup, 1.25 |
| 8 | Solprene-303 | A-230U | 240 | Dicup, 1.25 |
| 9 | Solprene-303 | A-230U | 180 | Dicup, 1.25 |
| 10 | Solprene-303 | A-230U | 216 | Dicup, 1.25 |
| 11 | Solprene-303 | A-280H | 500[b] | Dicup, 1.25 |
| 12 | Solprene-303 | A-280H | 240 | Dicup, 1.25 |
| 13 | Solprene-303 | A-518 | 500[b] | Dicup, 1.25 |
| 14 | Solprene-303 | A-518 | 600[b] | Dicup, 1.25 |
| 15 | Solprene-303 | A-518 / A-280H / A-92 | 168 / 56 / 56 | Dicup, 1.25 |
| 16 | Solprene-303 | A-Micro 875 | 220 | Dicup, 1.25 |
| 17 | Solprene-303 | A-4084 | 200 | Dicup, 1.25 |
| 18 | Solprene-303 | S-5033 | 220 | Dicup, 1.25 |
| 19 | Solprene-304 | A-230U | 216 | Dicup, 1.25 |
| 20 | Solprene-1204 | A-230U | 240 | Dicup, 1.25 |
| 21 | Solprene-1205 | A-230U | 240 | Dicup, 1.25 |
| 22 | Paracril-B | A-230U | 200 | Dicup, 1.25 |
| 23 | Paracril-BJ | A-230U | 220 | Dicup, 1.25 |
| 24 | Paracril-C | A-230U | 200 | Dicup, 1.25 |
| 25 | Paracril-C | Pyrolytic | 240 | Dicup, 1.5 |
| 26 | Paracril-D | A-230U | 200 | Dicup, 1.25 |
| 27 | Paracril-CJLT | A-230U | 220 | Dicup, 1.25 |
| 28 | Paracril-CJLT | A-230U | 100 | Dicup, 1.5 |
| 29 | Paracril-CJLT | A-230U | 260 | Chloranil, 4 |
| 30 | Purified CJLT[c] | A-230U | 310 | Chloranil, 3 / ZnO, 1 |
| 31 | Paracril C[d] / Paracril CJLT | A-230U | 240 | Chloranil, 3 / ZnO, 1 |
| 32 | Paracril C[d] / Paracril CJLT | A-280H | 240 | Chloranil, 3 / ZnO, 1 |
| 33 | Paracril C[d] / Paracril CJLT | A-92 | 240 | Chloranil, 3 / ZnO, 1 |
| 34 | Paracril C[d] / Paracril CJLT | A-230 | 280 | Chloranil, 3 / ZnO, 1 |
| 35 | Paracril C[d] / Paracril CJLT | A-518 / A-280H / A-92 | 168 / 56 / 56 | Chloranil, 3 / ZnO, 1 |
| 36 | Paracril BJ | A-230U | 240 | Chloranil, 3 / ZnO, 1 |

[a] Dicup = dicumyl peroxide
[b] These mixtures were prepared from cements in contrast to mill mixing employed in the other runs.
[c] Commercial grade of Paracril CJLT which was purified by washing with methanol, vacuum drying and milling to remove traces of solvent.
[d] Blends were 50/50 by weight.

TABLE IV

| Run No. | Flexural Strength At Rm. Temp., psi Hours Baked at 500°F. 18 | Flexural Strength At Rm. Temp., psi Hours Baked at 500°F. 24 | Flexural Modulus at Rm. Temp., psi Hours Baked at 500°F. 18 | Flexural Modulus at Rm. Temp., psi Hours Baked at 500°F. 24 |
|---|---|---|---|---|
| 1 | — | 6,520 | — | $0.33 \times 10^6$ |
| 2 | — | 12,790 | — | $4.0 \times 10^5$ |
| 3 | — | 17,775 | — | $0.35 \times 10^6$ |
| 4 | — | 14,385 | — | $3.9 \times 10^6$ |
| 5 | — | 2,145 | — | — |
| 6 | — | 12,715[a] | — | $5.95 \times 10^{6[a]}$ |
| 7 | — | 11,295 | — | $4.36 \times 10^6$ |
| 8 | 13,025 | 13,560 | $4.5 \times 10^6$ | $5.05 \times 10^6$ |
| 9 | — | 10,315 | — | $2.35 \times 10^6$ |
| 10 | — | 11,945 | — | $3.4 \times 10^6$ |
| 11 | — | 12,910 | — | $5.71 \times 10^6$ |
| 12 | 11,670 | 11,285 | $4.25 \times 10^6$ | $3.8 \times 10^6$ |
| 13 | — | 7,770 | — | $3.9 \times 10^6$ |
| 14 | — | 6,810 | — | $5.02 \times 10^6$ |
| 15 | — | 12,905 | — | $5.34 \times 10^6$ |
| 16 | — | 14,750 | — | $4.5 \times 10^6$ |
| 17 | 8,715 | — | $1.32 \times 10^6$ | — |
| 18 | 8,965 | 8,580 | $1.53 \times 10^6$ | $1.65 \times 10^6$ |
| 19 | — | 10,795 | — | $2.81 \times 10^6$ |
| 20 | — | 10,795 | — | $2.95 \times 10^6$ |
| 21 | — | 4,880 | — | — |
| 22 | — | 13,845 | — | $2.92 \times 10^6$ |
| 23 | — | 15,595 | — | $3.77 \times 10^6$ |
| 24 | — | 15,810 | — | $4.16 \times 10^6$ |
| 25 | — | 10,790 | — | $1.36 \times 10^6$ |
| 26 | — | 13,640 | — | $2.59 \times 10^6$ |
| 27 | — | 18,340 | — | $4.85 \times 10^6$ |
| 28 | — | 13,600 | — | $2.22 \times 10^6$ |
| 29 | — | 19,605 | — | $5.62 \times 10^6$ |
| 30 | — | 17,590 | — | $6.22 \times 10^6$ |
| 31 | 17,340 | 19,010[b] | $4.84 \times 10^{6[b]}$ | $5.62 \times 10^{6[c]}$ |
| 32 | — | 18,025 | — | $3.88 \times 10^6$ |
| 33 | — | 16,810 | — | $4.25 \times 10^6$ |
| 34 | — | 13,925 | — | $4.09 \times 10^6$ |
| 35 | — | 18,050 | — | $5.15 \times 10^6$ |
| 36 | 16,530 | 18,375 | $4.41 \times 10^6$ | $4.53 \times 10^6$ |

[a] The corresponding tensile values for this sample were: Strength - 6,765 psi Modulus - $5.05 \times 10^6$
[b] The tensile strength of this sample was 13,270 psi.
[c] The tensile modulii of these two samples were $5.95 \times 10^6$.

It will be noted that when no filler is used in the flexural flexual modulus obtained was 350,000 psi. By proper compounding with graphite fillers, it was possible to get modulus values well over five million and in case of nitrile elastomers, a value over six million. Limited data on tensile modulii indicate values at least as high as corresponding flexural values.

When used in like concentration, a more finely divided graphite gave higher modulus values. Comparing Runs Nos. 7 and 8 using 240 parts of natural flake graphite, that with powder of 65 percent through 325 mesh gave a baked composite having a flexural modulus of $4.36 \times 10^6$, whereas when using like graphite but of particle size 98 percent through 325 mesh, the higher value of $5.05 \times 10^6$ was obtained. However, with the coarser graphite it was possible to go to a higher filler concentration and thereby obtain even higher modulus values. For example, when the 65 percent through 325 mesh was used in a like compound but in 320 parts per 100 of elastomer (Run 6), a flexural modulus of $5.95 \times 10^6$ was obtained. However, use of graphite of truly micro particle size (Run 16) failed to give as good modulus value as did the corresponding macro grades. As is well known, the opposite is true in case of carbon blacks.

Although graphite having the more needle type shaped particles, as exemplified by the so-called crystalline grades, gave somewhat poorer results than the flake type when used in proportions the order of 240 parts (Run No. 12 vs. Run No. 8). when using very high proportions of graphite filler, the crystalline grade is preferred. For example, when using 500 parts of graphite per 100 parts of butadiene-styrene elastomer, it was possible to obtain a $5.7 \times 10^6$ flexural modulus with the crystalline grade whereas with the flake grade poor physical properties were obtained.

It may be noted that the two runs with elastomers containing less than 20 percent of their unsaturation as the vinyl type (Runs No. 5 and 21) resulted in products of very low flexural strength and modulus values too low to record.

Runs 17, 18 and 25 illustrate the poor results obtained with synthetic graphites as compared to natural graphites. This is in spite of the fact that the pyrolytic grade (Run 25) is considered the preferred grade for use in plastics designated for high temperature uses.

EXAMPLE 3

As listed in Table II, two graphites were employed which had a carbon content of only about 85 percent (samples nos. A-441 and A-509F); the impurities in these samples are primarily clays. When these graphites were used as fillers in the butadiene polymers following the procedure outlined in Example 2, severe blistering occured during the vulcanization and baking steps. Such blistering is believed to arise largely from the water of crystallization of the clay impurities, but may also be due to occluded moisture or other volatile products held within the mass of crystals within the particles.

Graphite sample A-441 having a purity of only about 85 percent was compared to graphite sample A-230U, a graphite of like crystalline structure but 99 percent purity, and a sample of A-441 pretreated as described. Composites were prepared in accordance with the procedure set forth in Example 2. Table V indicates the physical properties of the corresponding composites.

TABLE V

| Physical Property | Graphites Used | | |
|---|---|---|---|
| | A-441 Treated[a] | A-441 | A-230U |
| Tensile strength of vulcanizate | 1,280 psi | 610 psi | 1360 psi |
| Flexural strength of cyclized vulcanizate (heated 24 hrs. at 500°F.) | 11,800 psi | Blistered | 12,055 psi |
| Flexural modulus of cyclized vulcanizate (heated 24 hrs. at 500°F.) | $3.67 \times 10^6$ psi | — | $4.85 \times 10^6$ psi | a. The A-441 graphite was pretreated with two parts of acetic anhydride and heated at 150°F. for two hours. The treated graphite was then aerated at room temperature overnight to allow any acetic acid and excess anhydride to evaporate. One part of morpholine was then added to neutralize any residual acid.

The results obtained with the purified A-441 graphite approach those obtained with the 99 percent grade. This represents a major saving since the cost of high purity grade graphite is about 3½ times that of the 85 percent grade.

EXAMPLE 4 use of liquid plasticizers in elastomers improves processability and allows higher filler loadings. Liquid butadiene polymers and copolymers can be so used in the composites of the present invention. They do not have a diluent effect since they are cured in the peroxide vulcanization step and crosslink with the elastomer in the cyclization step. Composites were prepared in which 20 percent of Solprene-303 was replaced with a liquid butadiene-styrene copolymer of approximately 2,000 molecular weight prepared by sodium catalysis. The following test data were obtained on the graphite composites prepared as described in Example 2.

| Graphite Used | | Flexural, PSI | |
|---|---|---|---|
| Type | Parts | Strength | Modulus |
| A-230U | 280 | 13,875 | $5.5 \times 10^6$ |
| A-230 | 320 | 13,850 | $6.02 \times 10^6$ |

Thus, use of the reactive liquid plasticizer resulted not only in improved processability, but also cyclized products of premium properties.

EXAMPLE 5

Although a peroxide curative is preferred in the vulcanization step of an all hydrocarbon elastomer, the quinone type is also applicable. 100 parts of Solprene-303 was blended on a rubber mill with 5 parts of zinc oxide, 240 parts of A-230U graphite filler and 3 parts of chloranil. The rubber blend was cured by heating at 295°F. for one-half hour and at 310°F. for ½ hour. Samples of the cured rubber were thereafter baked for 18 and 24 hours at 500°F. and exhibited the following physical properties:

| | |
|---|---|
| Flexural strength after 18 hrs. at 500°F. | 13,495 psi |
| Flexural strength after 24 hrs. at 500°F | 14,325 psi |
| Flexural modulus after 18 hrs. at 500°F. | $4.45 \times 10^6$ psi |
| Flexural modulus after 24 hrs. at 500°F. | $4.62 \times 10^6$ psi |

While the above examples illustrate the invention in great detail, it should be understood that this invention in its broadest aspects is not necessarily limited to the specific materials, conditions and procedures shown therein. The present invention is limited only by the claims which follow.

What is claimed is:

1. A high modulus composite prepared by the cyclization under non-oxidizing conditions, of a substantially emulsifier-free elastomer chosen from polybutadiene and copolymers of butadiene with acrylonitrile or styrene, and having at least 10 percent 1,2-type unsaturation before cyclization, and containing 100–800 parts by weight of natural graphite of at least 85 percent purity per 100 parts of elastomer, said composite being cured with an organic peroxide or quinone prior to cyclization.

2. The composite of claim 1 having tensile and flexural modulii exceeding one million pounds per square inch.

3. The composite of claim 1 wherein the elastomer is a copolymer of butadiene and acrylonitrile.

4. The composite of claim 1 wherein the elastomer is a copolymer of butadiene and styrene.

5. The composite of claim 1 wherein the graphite consists of the natural flake or crystalline grade of at least 98 percent purity.

6. The composite of claim 1 wherein the graphite used is of mine-run grade of at least 85 percent purity which has been pretreated to remove water of crystallization therefrom prior to mixing with the elastomer.

7. The composite of claim 1 wherein the elastomer is prepared by emulsion polymerization.

8. The composite of claim 2 wherein the graphite powder is of such fineness that at least 90 percent passes through a 200-mesh screen.

* * * * *

UNITED STATES PATENT OFFICE
CERTIFICATE OF CORRECTION

Patent No. 3,867,333                    Dated February 18, 1975

Inventor(s) Byron M. Vanderbilt

It is certified that error appears in the above-identified patent and that said Letters Patent are hereby corrected as shown below:

Column 1, line 67, "Butadieneacrylonitrile" should read -- Butadiene - acrylonitrile --.

Column 3, line 57, "not" should read -- now --.

Column 4, line 5, "anhydrode" should read -- anhydride --.

Column 5, line 13, "desireed" should read -- desired --.

Column 5, line 21, after "utilized" add -- ) --.

Column 5, line 23, "330" should read -- 350 --.

Signed and sealed this 17th day of June 1975.

(SEAL)
Attest:

RUTH C. MASON
Attesting Officer

C. MARSHALL DANN
Commissioner of Patents
and Trademarks